(12) United States Patent
Bennett et al.

(10) Patent No.: US 7,740,283 B2
(45) Date of Patent: *Jun. 22, 2010

(54) TUBE FITTING WITH SEPARABLE TUBE GRIPPING DEVICE

(75) Inventors: Mark A. Bennett, Bainbridge Township, OH (US); Peter C. Williams, Cleveland Heights, OH (US)

(73) Assignee: Swagelok Company, Solon, OH (US)

( * ) Notice: Subject to any disclaimer, the term of this patent is extended or adjusted under 35 U.S.C. 154(b) by 16 days.

This patent is subject to a terminal disclaimer.

(21) Appl. No.: 11/928,104

(22) Filed: Oct. 30, 2007

(65) Prior Publication Data

US 2008/0048441 A1  Feb. 28, 2008

Related U.S. Application Data

(63) Continuation of application No. 11/522,814, filed on Sep. 14, 2006, now Pat. No. 7,407,196, which is a continuation of application No. 10/467,444, filed on Aug. 6, 2003, now Pat. No. 7,108,288.

(60) Provisional application No. 60/266,735, filed on Feb. 6, 2001, provisional application No. 60/329,943, filed on Oct. 17, 2002.

(51) Int. Cl.
*F16L 35/00* (2006.01)

(52) U.S. Cl. ............................ 285/3; 285/323; 285/249

(58) Field of Classification Search .................... 285/3, 285/323, 249
See application file for complete search history.

(56) References Cited

U.S. PATENT DOCUMENTS

| 771,682 A | 10/1904 | Sussman |
|---|---|---|
| 791,905 A | 6/1905 | Higginbotham |
| 1,058,542 A | 4/1913 | Brown |
| 1,334,130 A | 3/1920 | Blanchard |
| 1,755,210 A | 4/1930 | Dohner |
| 1,889,778 A | 12/1932 | Dobrick |
| 1,927,464 A | 9/1933 | McIntosh |
| 1,983,840 A | 12/1934 | Dohner |
| 2,083,091 A | 6/1937 | Rector |
| 2,127,611 A | 8/1938 | Mueller |
| 2,139,413 A | 12/1938 | Kreidel |
| 2,150,042 A | 3/1939 | Shultz |

(Continued)

FOREIGN PATENT DOCUMENTS

DE     4041679     6/1992

(Continued)

OTHER PUBLICATIONS

Office action from Japanese Patent Application Serial No. 30722/05, mailed Mar. 24, 2008, received on Mar. 31, 2008.

(Continued)

*Primary Examiner*—David E Bochna
(74) *Attorney, Agent, or Firm*—Calfee, Halter & Griswold LLP

(57) ABSTRACT

A tube fitting for a tube end has a female member that cooperates with a male member. A tube gripping device in the form of a gripping ring or ferrule is retained with the female member. Upon a partial pull-up, the tube gripping device separates from the female member.

39 Claims, 5 Drawing Sheets

U.S. PATENT DOCUMENTS

| | | |
|---|---|---|
| 2,152,537 A | 3/1939 | Couty |
| 2,165,626 A | 7/1939 | Ford |
| 2,179,127 A | 11/1939 | Lauer |
| 2,284,216 A | 5/1942 | Kunkel |
| 2,333,470 A | 11/1943 | Cowles |
| 2,405,822 A | 8/1946 | Franck |
| 2,406,488 A | 8/1946 | Brock |
| 2,450,170 A | 9/1948 | Smith |
| 2,452,276 A | 10/1948 | Woodling |
| 2,460,621 A | 2/1949 | Courtot |
| 2,460,635 A | 2/1949 | Herold |
| 2,474,178 A | 6/1949 | Wurzburger |
| 2,497,274 A | 2/1950 | Richardson |
| 2,508,763 A | 5/1950 | Mercier |
| 2,511,134 A | 6/1950 | Stranberg |
| 2,544,109 A | 3/1951 | Richardson |
| 2,553,981 A | 5/1951 | Richardson |
| 2,544,108 A | 6/1951 | Richardson |
| 2,561,648 A | 7/1951 | Bradley |
| 2,579,529 A | 12/1951 | Woodling |
| 2,641,489 A | 6/1953 | Hedberg, Jr. |
| 2,693,374 A | 11/1954 | Wurzburger |
| 2,738,994 A | 3/1956 | Kreidel et al. |
| 2,755,110 A | 7/1956 | Jacobs |
| 2,761,704 A | 9/1956 | Crawford |
| 2,768,845 A | 10/1956 | Samiran |
| 2,823,935 A | 2/1958 | Wurzburger |
| 2,935,339 A | 5/1960 | Frederick |
| 3,006,558 A | 10/1961 | Jacobs |
| 3,007,721 A | 11/1961 | Schmohl et al. |
| 3,025,084 A | 3/1962 | Franck |
| 3,103,373 A | 9/1963 | Lennon et al. |
| 3,120,969 A | 2/1964 | Schmohl |
| 3,139,293 A | 6/1964 | Franck |
| 3,167,333 A | 1/1965 | Hall et al. |
| 3,195,933 A | 7/1965 | Jacobs |
| 3,215,457 A | 11/1965 | Teeters |
| 3,248,136 A | 4/1966 | Brozek et al. |
| 3,275,350 A | 9/1966 | Kody et al. |
| 3,290,062 A | 12/1966 | Ziherl et al. |
| 3,290,092 A | 12/1966 | Howard |
| 3,319,293 A | 5/1967 | Gollos |
| 3,325,192 A | 6/1967 | Sullivan |
| 3,326,582 A | 6/1967 | Currie |
| 3,379,461 A | 4/1968 | Davis |
| 3,445,128 A | 5/1969 | Teeters |
| 3,454,290 A | 7/1969 | Tairraz |
| 3,512,812 A | 5/1970 | Kreidel et al. |
| 3,565,467 A | 2/1971 | Haldopoulos et al. |
| 3,580,617 A | 5/1971 | Ehrenberg et al. |
| 3,684,322 A | 8/1972 | Kotsakis |
| 3,695,647 A | 10/1972 | Pugliese |
| 3,708,186 A | 1/1973 | Takagi et al. |
| 3,736,008 A | 5/1973 | Crawford |
| 3,743,324 A | 7/1973 | Schwarz et al. |
| 3,857,591 A | 12/1974 | Voss |
| 3,888,521 A | 6/1975 | O'Sickey |
| 3,893,716 A | 7/1975 | Moreiras et al. |
| 3,895,832 A | 7/1975 | Ellis et al. |
| 3,923,323 A | 12/1975 | Brogan |
| 3,970,337 A | 7/1976 | Niemeyer |
| 3,977,708 A | 8/1976 | Jopp |
| 3,992,043 A | 11/1976 | Whitley |
| 4,022,497 A | 5/1977 | Kotsakis |
| 4,026,581 A | 5/1977 | Pasbrig |
| 4,033,614 A | 7/1977 | Hanson |
| 4,037,864 A | 7/1977 | Anderson et al. |
| 4,072,328 A | 2/1978 | Elliott |
| 4,076,286 A | 2/1978 | Spontelli |
| 4,133,312 A | 1/1979 | Burd |
| 4,133,565 A | 1/1979 | Shutt |
| 4,136,896 A | 1/1979 | Rodman et al. |
| 4,136,897 A | 1/1979 | Haluch |
| 4,169,967 A | 10/1979 | Bachle |
| 4,192,532 A | 3/1980 | Pacella |
| 4,256,334 A | 3/1981 | Boisset et al. |
| 4,293,149 A | 10/1981 | Bonel |
| 4,304,422 A | 12/1981 | Schwarz |
| 4,309,050 A | 1/1982 | Legris |
| 4,343,456 A | 8/1982 | Zitzloff |
| 4,458,927 A | 7/1984 | Smith |
| 4,483,555 A | 11/1984 | Ludwig |
| 4,500,117 A | 2/1985 | Ayers et al. |
| 4,508,374 A | 4/1985 | Kantor |
| 4,523,256 A | 6/1985 | Small |
| 4,529,231 A | 7/1985 | Greenawalt |
| 4,538,836 A | 9/1985 | Krutten |
| 4,538,842 A | 9/1985 | Kowal et al. |
| 4,541,537 A | 9/1985 | Sailor |
| 4,556,242 A | 12/1985 | Kowal et al. |
| 4,586,731 A | 5/1986 | Castrup |
| 4,630,851 A | 12/1986 | Ogawa |
| 4,647,086 A | 3/1987 | Maxwell et al. |
| 4,655,485 A | 4/1987 | Albrecht et al. |
| 4,682,797 A | 7/1987 | Hildner |
| 4,739,828 A | 4/1988 | Bayer et al. |
| 4,789,759 A | 12/1988 | Jones |
| 4,890,867 A | 1/1990 | Briggs et al. |
| 4,903,942 A | 2/1990 | Licciardello et al. |
| 4,940,263 A | 7/1990 | Mayernik |
| 4,944,534 A | 7/1990 | Kotyk |
| 5,074,155 A | 12/1991 | Vecere |
| 5,074,599 A | 12/1991 | Wirbel et al. |
| 5,114,190 A | 5/1992 | Chalmers |
| 5,134,676 A | 7/1992 | Boillot et al. |
| 5,163,722 A | 11/1992 | Worden |
| 5,193,616 A | 3/1993 | Hynes |
| 5,217,261 A | 6/1993 | DeWitt et al. |
| 5,240,289 A | 8/1993 | Gottling et al. |
| 5,335,946 A | 8/1994 | Dent et al. |
| 5,351,998 A | 10/1994 | Behrens et al. |
| 5,439,259 A | 8/1995 | Taga et al. |
| 5,489,127 A | 2/1996 | Anglin et al. |
| 5,607,194 A | 3/1997 | Ridenour |
| 5,658,025 A | 8/1997 | Ridenour |
| 5,711,549 A | 1/1998 | Beans |
| 5,716,082 A | 2/1998 | Vogel et al. |
| 5,718,459 A | 2/1998 | Davie et al. |
| 5,725,259 A | 3/1998 | Dials |
| 5,823,256 A | 10/1998 | Moore |
| 5,954,375 A | 9/1999 | Trickle et al. |
| 5,961,160 A | 10/1999 | Frohlich |
| 6,007,112 A | 12/1999 | Kim |
| 6,022,053 A | 2/2000 | Hukuda |
| 6,039,361 A | 3/2000 | Meli |
| 6,045,164 A | 4/2000 | Nishio |
| 6,073,976 A | 6/2000 | Schmidt et al. |
| 6,089,620 A | 7/2000 | Mota Lopez et al. |
| 6,093,303 A | 7/2000 | Williams et al. |
| 6,102,449 A | 8/2000 | Welsh |
| 6,109,660 A | 8/2000 | Akiyama et al. |
| 6,123,364 A | 9/2000 | Inoue et al. |
| 6,131,963 A | 10/2000 | Williams et al. |
| 6,165,597 A | 12/2000 | Williams et al. |
| 6,168,211 B1 | 1/2001 | Schorn-Gilson |
| 6,173,995 B1 | 1/2001 | Mau |
| 6,179,348 B1 | 1/2001 | Okamoto |
| 6,279,242 B1 | 8/2001 | Williams et al. |
| 6,361,083 B1 | 3/2002 | Riesselmann et al. |
| 6,438,814 B1 | 8/2002 | Seymour et al. |
| 6,461,448 B1 | 10/2002 | Williams et al. |
| 6,547,888 B1 | 4/2003 | Williams et al. |
| 7,066,496 B2 | 6/2006 | Williams |
| 7,108,288 B2 | 9/2006 | Bennett et al. |

| | | | |
|---|---|---|---|
| 7,407,196 B2 | 8/2008 | Bennett et al. | |
| 2004/0212192 A1 | 10/2004 | Williams et al. | |
| 2006/0049632 A1 | 3/2006 | Williams et al. | |
| 2008/0048441 A1 | 2/2008 | Bennett et al. | |

FOREIGN PATENT DOCUMENTS

| | | |
|---|---|---|
| EP | 034 493 | 8/1981 |
| EP | 118 656 | 6/1986 |
| EP | 205 170 | 12/1986 |
| EP | 224 188 | 6/1987 |
| EP | 309 179 | 3/1989 |
| EP | 371 063 | 2/1992 |
| EP | 484 091 | 5/1992 |
| EP | 285 677 | 12/1992 |
| EP | 396 367 | 1/1993 |
| EP | 531 068 | 3/1993 |
| EP | 581 408 | 2/1994 |
| EP | 528 079 | 3/1994 |
| EP | 489 289 | 5/1994 |
| EP | 638 752 | 2/1995 |
| EP | 523 020 | 2/1996 |
| EP | 583 707 | 3/1996 |
| EP | 441 676 | 6/1996 |
| EP | 751 334 | 1/1997 |
| EP | 762 003 | 3/1997 |
| EP | 863 354 | 9/1998 |
| EP | 879 980 | 11/1998 |
| EP | 895 014 | 2/1999 |
| EP | 940 617 | 9/1999 |
| EP | 1020675 | 7/2000 |
| EP | 1033518 | 9/2000 |
| EP | 1055859 | 11/2000 |
| FR | 818587 | 3/1937 |
| GB | 1057900 | 2/1967 |
| GB | 2032555 | 5/1980 |
| GB | 2080900 | 2/1982 |
| GB | 2258897 | 2/1993 |
| GB | 2259123 | 7/1995 |
| JP | 4429659 | 12/1969 |
| JP | 461 462 | 1/1971 |
| JP | 4874317 | 9/1973 |
| JP | 50149910 | 12/1975 |
| JP | 513 917 | 1/1976 |
| JP | 51017219 | 2/1976 |
| JP | 55159392 | 12/1980 |
| JP | 55181082 | 12/1980 |
| JP | 5621679 | 2/1981 |
| JP | 56066586 | 6/1981 |
| JP | 56124787 | 9/1981 |
| JP | 57202084 | 12/1982 |
| JP | 59006488 | 1/1984 |
| JP | 59-187184 | 10/1984 |
| JP | 60139988 | 7/1985 |
| JP | 6112886 | 5/1986 |
| JP | 61099790 | 5/1986 |
| JP | 61105391 | 5/1986 |
| JP | 5712887 | 1/1987 |
| JP | 1-58888 | 9/1987 |
| JP | 63231086 | 9/1988 |
| JP | 1054599 | 11/1989 |
| JP | 369026 | 10/1991 |
| JP | 3288091 | 12/1991 |
| JP | 4023157 | 4/1992 |
| JP | 4069488 | 3/1994 |
| JP | 6174171 | 6/1994 |
| JP | 7-243564 | 9/1995 |
| JP | 7243564 | 9/1995 |
| JP | 08-014449 | 1/1996 |
| JP | 11201347 | 7/1999 |
| JP | 11325342 | 11/1999 |
| JP | 2000097377 | 4/2000 |
| JP | 2000110975 | 4/2000 |
| JP | U3069026 | 5/2000 |
| JP | 2000170966 | 6/2000 |
| JP | 200199360 | 4/2001 |
| JP | 20010099337 | 4/2001 |
| JP | 2001141169 | 5/2001 |
| KR | 19920008397 | 5/1992 |
| KR | 19930006359 | 4/1993 |
| KR | 1998-072685 | 11/1998 |
| KR | 20010006382 | 1/2001 |
| KR | 200239292 | 7/2001 |
| WO | WO 93/24780 | 12/1983 |
| WO | WO 93/25837 | 12/1983 |
| WO | WO 84/00796 | 3/1984 |
| WO | WO 88/04385 | 6/1988 |
| WO | WO 89/09904 | 10/1989 |
| WO | WO 89/12190 | 12/1989 |
| WO | WO 94/23234 | 10/1994 |
| WO | WO 97/07356 | 2/1997 |
| WO | WO 97/14905 | 4/1997 |
| WO | WO 97/43571 | 11/1997 |
| WO | WO 98/32999 | 7/1998 |
| WO | WO 98/46925 | 10/1998 |
| WO | WO 99/24750 | 5/1999 |
| WO | WO 99/34142 | 7/1999 |
| WO | WO 01/20214 | 3/2001 |
| WO | WO 01/73333 | 10/2001 |
| WO | WO 02/063194 | 8/2002 |
| WO | WO 02/063195 | 8/2002 |
| WO | WO 2005/019717 | 3/2005 |

OTHER PUBLICATIONS

Examination Report issued Aug. 22, 2005 from corresponding European Patent Application Serial No. 02703345.5, 2 pgs.

International Search Report from PCT/US02/03430, mailed Nov. 6, 2002.

International Search Report and Written Opinion from PCT/US2004/026096, mailed Dec. 29, 2004.

Parker Hannfin Corporation, Suparcase, The Invisible Breakthrough, Parker Supercase Promotion Folder, Parker Hannifin Corporation, Huntsville, AL.

Parker Hannifin Corporation, Parker Suparcase Process Hardens Stainless Steel to Become More Resistant to Corrosion, News Release, Parker Hannifin Corporation, Huntsville, AL.

Parker Hannifin Corporation, Engineering Report—Ferrule Design Suparcase, Parker Suparcase Bulletin, 4230-B15.1, Parker Hannifin Corporation, Huntsville, AL.

Parker Hannifin Corporation Suparcase, A Proprietary Process for the Hardening of Stainless Steel Ferrules, Parker Suparcase Bulletin, Mar. 1993, 4230-B15.3, Parker Hannifin Corporation, Huntsville, AL.

Examination Report issued Aug. 4, 2006 from corresponding European Patent Application Serial No. 02703345.5, 4 pgs.

Office action from Japanese Serial No. 2002-562904, dispatched Aug. 7, 2007, received on Nov. 9, 2007.

Notice of Allowance from U.S. Appl. No. 10/467,444, mailed May 5, 2006.

Office action from U.S. Appl. No. 10/467,444, mailed Nov. 29, 2005.

Office action from U.S. Appl. No. 10/467,444, mailed May 11, 2005.

Office action from U.S. Appl. No. 10/467,444, mailed Oct. 27, 2004.

Interview Summary from U.S. Appl. No. 10/642,094, mailed Apr. 25, 2006.

Supplemental Notice of Allowability from U.S. Appl. No. 10/642,094, mailed Feb. 28, 2006.

Notice of Allowance from U.S. Appl. No. 10/642,094, mailed Jan. 26, 2006.

Office action from U.S. Appl. No. 10/642,094, mailed May 11, 2005.

Advisory Action from U.S. Appl. No. 10/642,094, mailed Mar. 22, 2005.

Office action from U.S. Appl. No. 10/642,094, mailed Dec. 28, 2004.

Office action from U.S. Appl. No. 10/a642,094, mailed Jun. 3, 2004.

Office action from U.S. Appl. No. 11/522,814, mailed Jun. 6, 2007.

Office action from U.S. Appl. No. 11/522,814, mailed Dec. 28, 2007.

Office action from U.S. Appl. No. 11/255,499 mailed Apr. 21, 2008.
Office action from U.S. Appl. No. 11/112,800, mailed May 2, 2008.
Office action from U.S. Appl. No. 11/928,136, mailed Jun. 18, 2008.
Office action from Korean Application No. 10-2008-7020649 mailed Nov. 14, 2008.
Response from U.S. Appl. No. 11/928,136 dated Sep. 18, 2008.
Office action from U.S. Appl. No. 11/928,136 dated Dec. 18, 2008.
Response from U.S. Appl. No. 11/928,136 dated Feb. 17, 2009.
Office action from U.S. Appl. No. 11/928,136 dated Mar. 10, 2009.
Response from U.S. Appl. No. 11/928,136 dated Jun. 3, 2009.

TUBE FITTING WITH SEPARABLE TUBE GRIPPING DEVICE

RELATED APPLICATIONS

This application is a continuation of U.S. application Ser. No. 11/522,814, filed on Sep. 14, 2006 for TUBE FITTING WITH SEPARABLE TUBE GRIPPING DEVICE, now U.S. Pat. No. 7,407,196, which is a continuation of U.S. application Ser. No. 10/467,444, filed Aug. 6, 2003, now U.S. Pat. No. 7,108,288 which claims the benefit of International Application Serial No. PCT/US02/03431, filed Feb. 6, 2002 which claims the benefit of U.S. Provisional patent application Ser. No. 60/266,735 filed on Feb. 6, 2001 for TUBE FITTING WITH INTEGRAL NUT AND FERRULE, and Ser. No. 60/329,943 filed on Oct. 17, 2002 for TUBE FITTING, the entire disclosures of which are fully incorporated by reference.

TECHNICAL FIELD OF THE INVENTION

The subject invention is generally directed to the art of tube fittings. More particularly, the invention is directed to a flareless tube fitting that uses a tube gripping element that is initially joined to one of the coupling elements and separates therefrom during assembly onto a tube end.

BACKGROUND OF THE INVENTION

Tube fittings are used to join or connect a tube end to another member, whether that other member be another tube end such as through T-fittings and elbow fittings, for example, or a device that needs to be in fluid communication with the tube end, such as for example, a valve. As used herein the terms "tube" and "tubing" are intended to include but not be limited to pipe as well. Any tube fitting must accomplish two important functions within the pressure, temperature and vibration criteria that the tube fitting is designed to meet. First, the tube fitting must grip the tube end so as to prevent loss of seal or tube blow out. Secondly, the tube fitting must maintain a primary seal against leakage. The requirement that a tube fitting accomplish these two functions has been the driving factor in tube fitting design for decades. A multitude of factors influence the design of a tube fitting to meet a desired grip and seal performance criteria, but basic to any tube fitting design will be: 1) the characteristics of the tubing that the fitting must work with, including the material, outside diameter and wall thickness; and 2) the tube grip and seal performance level required of the tube fitting for its intended applications. The goal is to design a tube fitting that reliably achieves the desired tube grip and seal functions within whatever cost constraints are imposed on the product by competing designs in the marketplace.

A flareless tube fitting generally refers to a type of tube fitting in which the tube end remains substantially tubular, in contrast to a flared tube fitting in which the tube end is outwardly flared over a fitting component. Flared tube ends are commonly encountered in use with plastic tubing and plastic tube fittings. The present invention is not primarily directed to plastic tubing or tube fittings because such fittings have significantly different challenges and material properties that affect the ability of the fitting to both grip the tube and provide an adequate seal. However, some of the aspects of the invention may apply to non-metal tube fittings, particularly the separable tube gripping element aspect.

Tube fittings that are intended for use with stainless steel and other metal tubing, for example, are particularly challenging to design in order to achieve the desired tube grip and seal functions. This arises from the nature of stainless steel which, in terms of typical commercially available tubing material, is a very hard material, usually on the order of up to 200 Vickers. Stainless steel and other metal tubing is also used for high pressure applications in which the tubing wall thickness is substantial (referred to in the art as "heavy walled" tubing). Heavy wall tubing is difficult to grip because it is not only hard but it is also not particularly ductile. Low ductility makes it more difficult to deform the tubing plastically so as to achieve a desired tube grip.

Tube fittings typically include an assembly of: 1) a tube gripping device, often in the form of a ferrule or ferrules, or a gripping ring-like structure, and 2) a pull-up mechanism for causing the tube gripping device to be installed on a tube end so as to grip the tube end and provide a seal against leakage. The term "pull-up" simply refers to the operation of tightening the tube fitting assembly so as to complete the assembly of the fitting onto the tube end with the desired tube grip and seal.

Usually a tube fitting is first assembled in a "finger tight" condition and then a wrench or other suitable tool is used to tighten or "pull up" the fitting to its final initial and complete assembled condition. The pull up mechanism most commonly used is a threaded connection of a female threaded nut component and a male threaded body component, with the tube gripping device being acted upon by these two components as they are threaded and tightened together. The body includes a tube end receiving bore with an angled camming surface at the outer portion of that bore. The most commonly used camming surfaces are frusto-conical such that the term "camming angle" refers to the cone angle of the camming surface relative to the tube end longitudinal axis or outer surface. The tube end is axially inserted into the body bore and extends past the frusto-conical camming surface. The gripping device is slipped onto the tube end and the nut is partially threaded onto the body to the finger tight position such that the tube gripping device captured axially between the camming surface and the nut. The nut typically includes an inward shoulder that drives the tube gripping device into engagement with the angled camming surface on the body as the nut and body components are threadably tightened together. The angled camming surface imparts a radial compression to the tube gripping device, forcing the tube gripping device into a gripping engagement with the tube end. The tube gripping device typically is to form a seal against the outer surface of the tubing and also against the angled camming surface.

The most commonly used tube gripping devices in stainless steel tube fittings today (the most commonly used are ferrule-type tube fittings) achieve tube grip by causing a front or nose portion of the tube gripping device to bite into the tube end outer surface. As used herein, the term "bite" refers to the plastic deformation of the tube gripping device into the outer surface of the tube end so as to plastically deform and indent the tubing with an almost cutting-like action to create a generally radial shoulder or wall at the front end of the tube gripping device. This "bite" thus serves as a strong structural feature to prevent tube blow out at high pressure, particularly for larger diameter tubing such as ½" and higher.

Over the years there have been numerous tube fitting designs that do not rely on a "bite" type action, but rather merely radially compress the tube gripping device against the tubing outer surface, some with the effect of indenting into the tubing without creating a bite. These designs are not suitable for high pressure stainless steel tube fittings. The most common commercially available stainless steel tube fittings especially for high pressure applications have historically been of two radically distinct designs of the tube gripping device-single ferrule tube fittings and two ferrule tube fittings.

A single ferrule tube fitting, as the name implies, uses a single ferrule to accomplish both the tube grip and seal functions. However, it is becoming increasingly recognized that these two functions are at odds with each other when designing a tube fitting that can meet a desired tube grip and seal performance criteria. This is because the design criteria needed to assure that the tube fitting achieves an adequate tube grip usually works against the ability of the single ferrule to also provide an effective seal. Consequently, although prior art single ferrule fittings can achieve adequate tube grip in some cases, this tube grip performance comes at the expense of having a less effective seal. One result of this situation is that some single ferrule tube fittings have been designed with additional components and techniques to achieve an adequate seal. Less than optimum seal performance is particularly noted in single ferrule fittings that attempt to seal against gas, and especially high pressure gas. Single ferrule tube fittings thus are usually more suited to lower pressure liquid applications such as hydraulics, however, even in such lower pressure applications single ferrule seal performance remains less than desired.

For single ferrule tube fittings, the biting action is usually associated with the single ferrule being designed to bow in a radially outward direction from the tube wall in the central region or mid-portion of the single ferrule body between the front and back ends thereof. The front end of the ferrule is driven against the angled camming surface of the body by the nut pushing against the back end of the ferrule. The bowing action helps direct the front end of the single ferrule into the tube end. The bowing action is also used to cause the back end of the ferrule to likewise engage and grip the tube end. This is accomplished usually by provided an angled drive surface on the nut shoulder that engages the back end of the single ferrule so as to radially compress the back end of the ferrule into a gripping action on the tube end. In some single ferrule designs, the back end of the ferrule apparently is intended to bite into the tube end. This back end tube grip is sometimes used with the single ferrule in order to attempt to improve the tube fitting's performance under vibration because the back end grip attempts to isolate down-tube vibration from affecting the front end tube bite.

The use of a back end tube grip actually works against the effort to grip the tube end at the front end of the single ferrule. Ideally, the single ferrule should be completely in three dimensional compression between the nut and the camming surface of the body. Providing a back end grip actually places a counter acting tension to the single ferrule that works against the front end compression being used to provide the tube grip. Additionally, the outward bowing action tends to work against the effort to grip the tube at the front end of the single ferrule because, in order to enable the outward bowing action, the single ferrule requires a lessened mass that is adjacent the tube gripping "bite". The outward bowing action radially displaces ferrule mass central to the ferrule body away from the tube end. Consequently, an outwardly bowed single ferrule fitting could be more susceptible to ferrule collapse, loss of seal and possibly tube blow out at higher pressures.

In order to achieve an adequate tube grip on stainless steel tubing, single ferrule stainless steel tube fittings have historically used a rather shallow camming angle of between ten and twenty degrees. This range of angles is referred to herein as "shallow" only as a term of convenience in that the angle is rather small. The shallow canning angle has been used in single ferrule fittings to obtain a mechanical advantage because the shallow angle provides an axially elongated camming surface against which to slide and radially compress the single ferrule front end to bite into the tube end outer surface. Hard stainless steel tubing material necessitated this elongated sliding camming action in order to be able to get the single ferrule to create an adequate bite for tube grip. Over the years, the single ferrule has been through hardened or case hardened so as to be significantly harder than the stainless steel tubing, however, the shallow camming angle is still used today in such single ferrule fittings to obtain a mechanical advantage from the ferrule sliding along the camming surface to produce the "bite" so as to assure an adequate tube grip. An example of a commercially available single ferrule tube fitting that uses a case hardened ferrule and a shallow camming angle of about twenty degrees is the CPI fitting line available from Parker-Hannifin Corporation. Another example is the EO fitting line available from Ermeto GmbH that uses a through hardened single ferrule and a twelve degree camming angle.

In some single ferrule designs, a non-conical camming surface has been tried whereby an attempt is made to simply press the ferrule against the outer surface of the tube end, thereby not creating a bite. The result in such cases however is a low grip or low pressure only fitting that are not well suited to stainless steel fittings.

The shallow camming angle and elongated camming surface and axial movement needed to achieve an adequate tube grip with a single ferrule fitting, however, compromises the ability of the single ferrule to achieve the seal function, especially in extreme environments and for sealing gas. This is because the front end of the single ferrule attempts to make the seal against the axially elongated camming surface. The radially outward bowing action causes a larger portion of the outer surface of the front end of the single ferrule to come into contact with the camming surface against which it is being driven. The result necessarily is a larger seal surface area between the outer surface of the single ferrule and the camming surface. This enlarged seal area causes an unwanted distribution of the sealing force between the single ferrule and the camming surface, and also creates a larger area for surface imperfections to allow leaks to occur. This is particularly a metal to metal seal issue (as contrasted to non-metal to non-metal seals: for example, in a plastic fitting it is usually desirable to provide an enlarged seal contact area because the more highly ductile plastic material can better form a seal between the two surfaces.)

Because historically the single ferrule fitting has used a shallow camming angle to achieve adequate tube grip, the less than optimum seal function is either tolerated as a recognized limitation on the application of the fitting, or additional features have been designed into the single ferrule fitting, most notably attempts to include one or more elastomeric seals with the single ferrule or with which the single ferrule cooperates to provide a better seal with stainless steel tubing. See, for example, U.S. Pat. Nos. 6,073,976 and 5,351,998. U.S. Pat. No. 6,073,976 illustrates a typical example of a single "ferrule" (called a "cutting ring" in the patent) fitting that attempts to solve the "seal" issue with added elastomeric seal. The U.S. Pat. No. 5,351,998 describes the benefits obtained by separating the tube grip and seal functions into two separate components.

A commercially available and highly successful two ferrule fitting used for tubing is commercially available from Swagelok Company, Solon, Ohio and is described in U.S. Pat. Nos. 6,131,963 and 3,103,373 both of which are owned in common by the assignee of the present invention, the entire disclosures of which are fully incorporated herein by reference. In this two ferrule fitting, the tube grip and seal functions also are separately achieved by the use of two ferrules. The forward or front ferrule provides an excellent seal even against gas, and the back or rear ferrule provides an excellent tube grip.

The front ferrule achieves an excellent seal by camming against a shallow camming surface angle such as twenty degrees. This is because the front ferrule does riot need to slide excessively on the camming surface in order to achieve a tube grip function. Likewise, the front ferrule is not case hardened because the primary purpose of the front ferrule is to seal and is not to bite into the tube end. Thus the relatively "softer" front ferrule achieves an excellent seal, particularly against gas, even though the body conical camming surface presents a camming angle of about twenty degrees.

The back ferrule achieves the tube grip function in the above noted two ferrule tube fitting. The back ferrule is case hardened to be substantially harder than the tube end. The front end of the back ferrule cams against a frusto-conical camming surface formed in the back end of the front ferrule. The ostensible angle of this camming surface is forty-five degrees, but due to the sliding movement of the front ferrule, the effective camming angle is actually a shallow angle of about fifteen to twenty degrees. Although the effective camming angle for the back ferrule is shallow, the back ferrule is not required to provide a primary seal (although it can form secondary or backup seals). The back ferrule also does not exhibit the undesired bowing action but rather grips the tube end as a function of a radially inward hinging action. As used herein, the term "hinging" refers to a controlled deformation of the ferrule such that a central region or mid-portion of the ferrule body undergoes an inwardly radial compression, as distinctly contrasted to a bowing or radially outward displacement. Thus, the effective shallow camming angle not only does not compromise the fitting seal capability, it actually substantially enhances the overall performance of the tube fitting especially for stainless steel tubing.

By using separate ferrules for each to achieve primarily only one of the key tube fitting functions, the two ferrule tube fitting achieves tremendous tube grip and seal functions. This prior art two ferrule tube fitting thus has enjoyed tremendous commercial success especially in the art of stainless steel tubing in part due to its performance characteristics such as high pressure rating on the order of 15000 psi, wide temperature rating of cryogenic to 1200° F. and in many applications a significant number of remakes (a "remake" refers to the loosening and re-tightening of a fitting after an initial pull-up).

U.S. Pat. No. 3,248,136 illustrates use of a single locking ring as opposed to a ferrule, wherein the locking ring acts against a surface having an angle that appears to be greater than twenty degrees or more, but the ring does not appear to plastically deform into the tubing but rather remains elastic so that the ring is designed to retain its original shape after pull-up, both of which are features that are unsuitable for stainless steel tube fittings of the type considered herein. Japanese utility model publication 44-29659 illustrates a tightening ring that appears to be intended to have a bowing effect and grip the tube at the front and back ends. The fitting does not appear to be applicable to stainless steel tubing as the tube is covered with a resin cover.

Attempts have been made to design tube fittings with a tube gripping element that separates during pull-up to function as a single element tube gripping device. Known designs place the breakaway element on the male threaded component. Additionally, the known designs either force the tube gripping element against a shallow camming surface angle or do not attempt to create a tube gripping bite into the tube wall. Thus the prior art designs suffer from the same limitations as the prior art single ferrule tube fitting designs.

Many applications and uses of the above-described two ferrule SWAGELOK tube fitting do not require such high pressure, temperature and remake performance characteristics. The present invention is directed to a new fitting concept that can meet lower performance characteristics without compromising overall fitting integrity and performance.

SUMMARY OF THE INVENTION

In accordance with one aspect of the invention, a new tube fitting concept requires user assembly of only two components, namely a female fitting component and a male fitting component. The female fitting component and the male fitting component may be adapted to be threadably coupled together by relative rotation therebetween. The female fitting includes an initially retained tube gripping element or ferrule. The tube gripping element may be machined with the female fitting component or separately attached thereto by any convenient process such as brazing, welding or soldering, for example. The ferrule in one embodiment is designed to have a hinging action and to plastic deform during pull-up to embed the nose portion into the tubing wall for excellent tube grip, and an axially adjacent swage or collet zone that isolates the embedded nose portion from vibration effects. The hinging action also helps to keep the ferrule outer tapered surface in a generally line contact with the camming surface.

The ferrule in one embodiment is designed to have a hinging action and to plastic deform during pull-up to embed the nose portion into the tubing wall for excellent tube grip, and an axially adjacent swage or collet zone that isolates the embedded nose portion from vibration effects. The hinging action also helps to keep the ferrule outer tapered surface in a generally line contact with the camming surface.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE INVENTION

Figure 1:
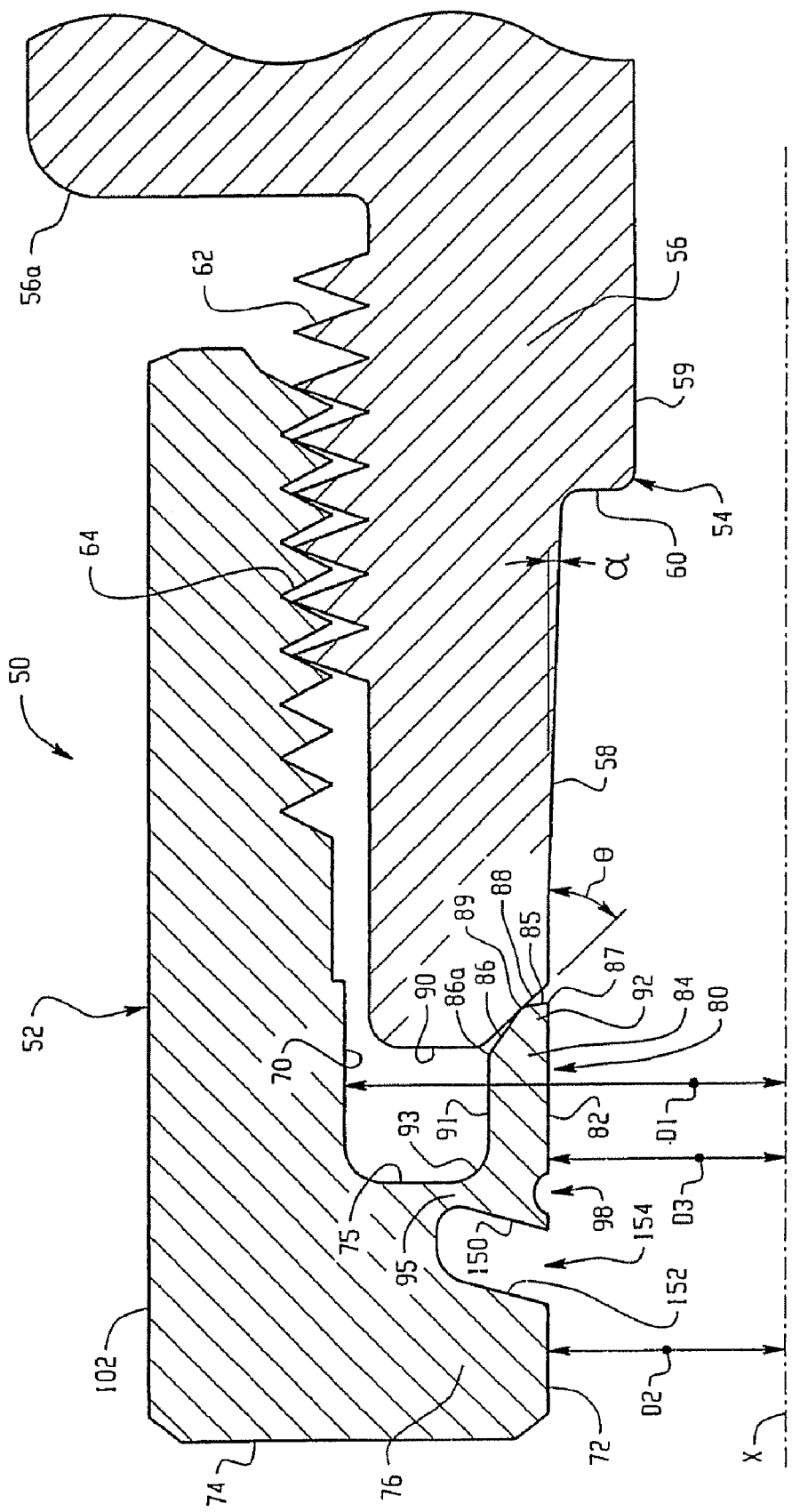
FIG. 1 illustrates in half longitudinal cross-section an exemplary embodiment of a tube fitting in accordance with the invention in a finger tight position.

In accordance then with one aspect of the invention, a tube fitting is provided having a tube gripping device that initially is integral with one of the coupling elements and upon pull-up separates therefrom to function as a single ferrule fitting. In the preferred embodiment, the tube gripping device or ferrule is integrally formed with a female threaded nut and is attached thereto by a frangible thin web portion that breaks as the ferrule cams initially against a camming surface of the male threaded component. As a single ferrule after separation, the ferrule acts against the steep camming angle surface of a male threaded body. The steep camming surface angle is particularly advantageous when the hardness of the tube gripping device has a ratio of at least about 3.3 times greater and preferably at least 4 times greater to the hardness of the tubing material.

Although a number of aspects of the invention are described herein as being incorporated into the exemplary embodiments, such description should not be construed in a limiting sense. For any particular application the various aspects of the invention may be used as required in different combinations and sub-combinations thereof. Furthermore, although the present disclosure describes and/or illustrates a number of design choices and alternative embodiments, such descriptions are not intended to be and should not be construed as an exhaustive list of such choices and alternatives. Those skilled in the art will readily appreciate and understand additional alternatives and design choices that are within the spirit and scope of the invention as set forth in the appended claims.

Although the various embodiments are described herein with specific reference to the fitting components being made of stainless steel, and in particular 316 stainless steel, such description is intended to be exemplary in nature and should not be construed in a limiting sense. Those skilled in the art will readily appreciate that the invention may be realized using any number of different types of metal materials for the fitting components, as well as metal tubing materials, including but not limited to 316, 316L, 304, 304L, any austenitic or ferritic stainless steel, any duplex stainless steel, any nickel alloy such as HASTALLOY, INCONEL or MONEL, any precipitation hardened stainless steel such as 17-4PH for example, brass, copper alloys, any carbon or low alloy steel such as 1018 steel for example, and any leaded, re-phosphorized or re-sulphurized steel such as 12L14 steel for example. An important aspect of the choice of materials is that the tube gripping device preferably should be case or through hardened to a ratio of at least about 3.3 and preferably 4 or more times harder than the hardest tubing material that the fitting will be used with. Therefore, the tube gripping device need not be made of the same material as the tubing itself. For example, as will be discussed hereinbelow, the tube gripping device may be selected from the stainless steel materials noted above, or other suitable materials that can be case hardened, such as magnesium, titanium and aluminum, to name some additional examples. Furthermore, the frangible feature of the tube gripping ring and female threaded nut may also be realized in non-metal tube fittings.

With reference to FIG. 1, the present invention contemplates a tube fitting 50 in which there are only two discrete components prior to assembly, namely a female threaded nut 52 and a male threaded body 54. The nut 52 is substantially different from the typical nut used in a prior art ferrule type tube fittings. The body 54 may be the similar in general design as a typical body used in prior fittings, however, as will be explained further herein, it is preferred but not necessary that the body 54 also be optimized for proper make-up with the new nut 52. Additionally, the body 54 need not be a discretely separate component but may be attached to or otherwise integral to another part such as a valve body, manifold or other components for example.

Note that in the drawings the fittings are illustrated in longitudinal cross-section but only half of the section is illustrated, it being understood that the other half is identical and omitted for clarity and ease of illustration. In all of the illustrations herein, various gaps and dimensions are somewhat exaggerated for ease of illustration.

The body 54 is a generally cylindrical main body 56 that has an integral extension or end 56a. The end extension 56a may be a hex body, for example, or part of another component such as for example a valve body as noted hereinabove. The main body 56 may be machined from the same stock as the end extension 56a or may be otherwise attached such as by welding or other suitable technique. The body 56 includes a first central longitudinal bore 58 that is appropriately sized to closely and slideably receive a tube end 13. The first bore 58 is somewhat larger in diameter than a coaxial second bore 59 that extends through the end extension 56a of the body 54. Of course, if the fitting 50 is a closed end connection, the inner bore 59 would not be a through bore.

The tube end 13 preferably bottoms against a counterbore 60. The body 56 is machined or otherwise formed with external male threads 62 that threadably mate with corresponding female threads 64 formed or machined in the nut 52. It is contemplated that in order to avoid inadvertent mixing of old and new style body and nut parts with prior art fitting components, that the thread pitch on the nut and body of the present invention may be substantially different from the thread pitch values of prior art ferrule-type tube fitting nuts and bodies. This will avoid interchange problems and also allows for a course pitch that provides high axial stroke with reduced nut rotation for complete pull-up. For example, a fitting that incorporates the present invention may use course pitch threads that provide sufficient axial displacement to achieve proper pull-up in a half turn. A typical prior art fitting by comparison is pulled-up with 1¼ to 1½ turns. Nothing however prevents the designer from making the thread pitch any value suitable to a particular application, as there are other techniques to avoid interchange issues. Therefore, the one-half turn for pull-up is just one example of a variety of design choices available.

The central body bore 58 is preferably although not necessarily formed with a slight radially inward taper a relative to the longitudinal axis X (FIG. 1) of the tube end 13 such that the diameter of the bore 58 decreases radially in the axial direction towards the counterbore 60. For example, this taper may be about 2° to about 4°, although the selected angle is not particularly critical. The bore 58 diameter at the counterbore shoulder is just slightly less than the outer diameter of the tube end 13. In this manner, the tube end 13 has a slight radial interference fit of a few thousandths of an inch for example with the bore 58. This interference between the bore 58 and the tube end 13 provides an anti-rotation action to help prevent the tube end 13 from rotating during pull-up. This also reduces residual torsion stress that may be induced into the tube end due to rotation of the tube gripping element (80) during pull-up. The tube end 13 does not necessarily have to bottom completely against the counterbore shoulder 60. This is because the interference fit helps provide a good primary seal between the bore 58 and the tube end 13. The interference fit also helps improve the tube grip by the tube gripping element (80) by axially holding the tube end stationary during pull-up so that the full axial displacement of the tube gripping element (80) is used for proper deformation and tube grip rather than any lost axial motion or movement of the tube end during tightening. The taper of the bore 58 may extend gradually along its entire axial length or a shorter axial portion adjacent the counterbore 60.

Figure 2:
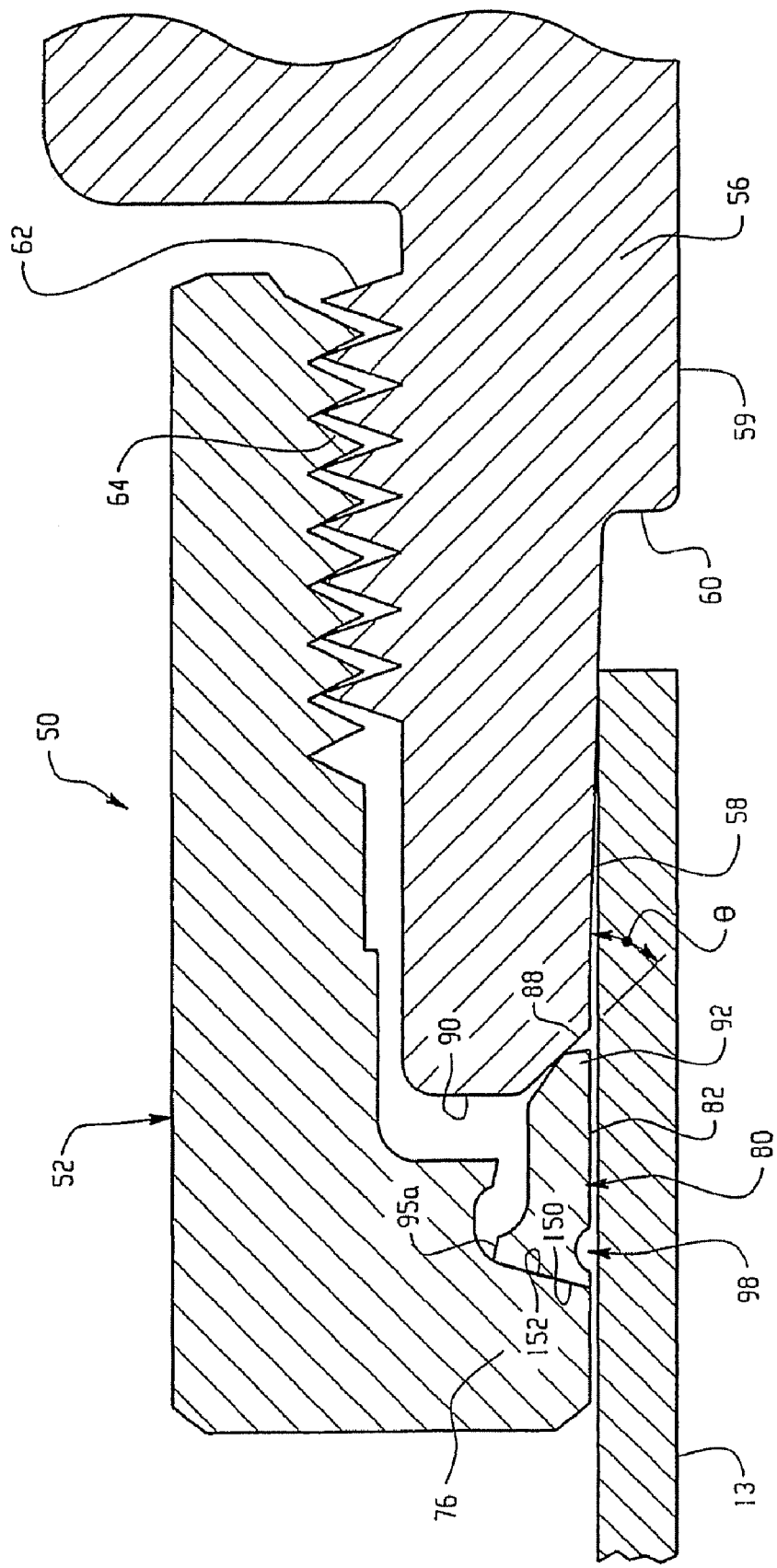
FIG. 2 illustrates the embodiment of FIG. 1 in a partially pulled up position.

The nut 52 includes a first central bore 70 having a first diameter D1 relative to the longitudinal axis of the fitting 50. The nut 52 also includes a second bore 72 having a second diameter D2 relative to the central longitudinal axis of the fitting 50. In this embodiment, the diameter D2 is less than the diameter D1. Furthermore, the diameter D2 is sized so that the bore 72 defines a generally cylindrical wall that receives the tube end 13 (FIG. 2). The first bore 70 terminates at a location that is axially spaced from the nut back end 74 to form a trepan 75, such that the nut 52 includes a radially inwardly extending collar 76. The collar 76 is generally defined by the back end wall 74 of the nut 52, the smaller diameter bore 72 and the larger diameter bore 70.

In accordance with a significant aspect of the invention, the nut 52 includes a tube gripping device 80 that extends axially inwardly in a somewhat cantilevered fashion from the collar 76. The tube gripping device in this example is in the general form of a gripping ring 80 and includes an inner bore 82 that defines a substantially cylindrical wall that closely receives the tube end 13 (FIG. 2). The diameter D3 of the bore 82 may be the same as or different from the diameter of the second nut bore 72. The cylindrical wall that defines the gripping ring bore 82 extends axially from a tapered front or nose portion 84 of the gripping ring 80. The nose portion 84 includes an axially tapered outer surface 86 that increases in the radial dimension towards the back end of the ring 80. The tapered outer surface 86 extends from a generally radial front end 85 of the gripping device 80. This generally radial front end 85 joins to the inner cylindrical bore 82 at a preferably sharp corner 87. Alternatively, however, there may be provided a circumferential recess or step or notch or other geometry (not shown) in the front end of the ring 80 having a diameter that is somewhat larger than the diameter D3 and axially extending from the front end 85 towards the back end 74 of the nut 52.

The tapered surface 86 joins the front end 85 preferably by a radius portion 89 and at its axial opposite end by a radius 86a to a generally cylindrical portion 91, which in turn joins via a radius 93 to the trepan 75.

It is noted at this point that the various geometry characteristics of the tube gripping device 80 (such as, for example, the various recesses, notches, tapered portions, radius portions, and so on) are selected so as to effect an appropriate radially inward hinging action as will be further explained hereinafter. Accordingly, the geometry of a tube gripping device 80 will be determined by the characteristics of the material of the tubing such as hardness and the fitting components, the dimensions of the tubing and the required tube grip and seal performance needed for a particular application. Therefore, the specific embodiments illustrated herein are intended to be exemplary in nature and not limiting as to the geometry of the tube gripping device. The above referenced patents for the two ferrule fitting also illustrate additional geometry variations to facilitate the hinging effect to obtain a desired tube grip.

Figure 1A:
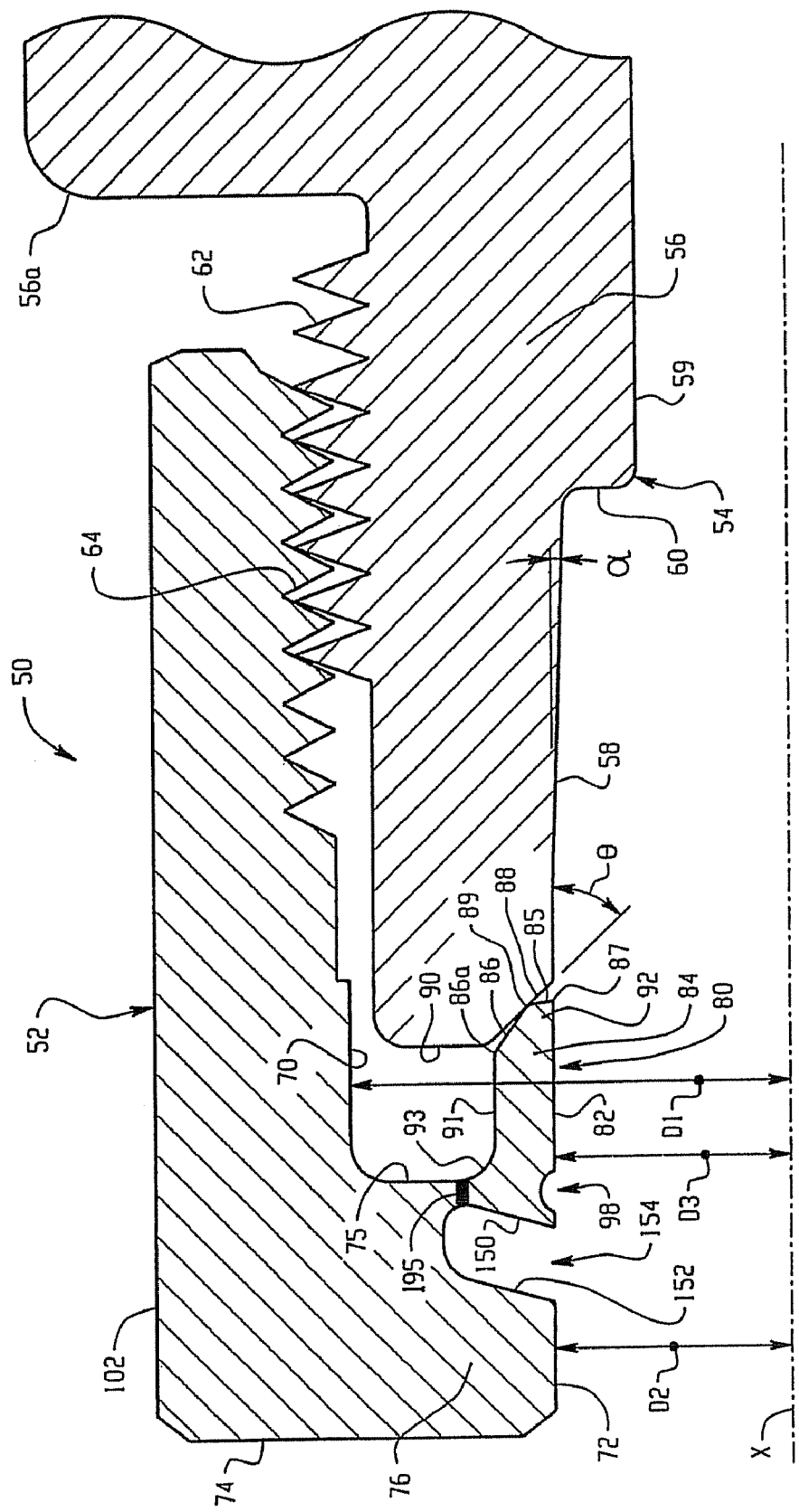
FIG. 1A illustrates an embodiment of the tube fitting shown in FIG. 1 where a tube gripping element is separately attached.

In accordance with another aspect of the invention, the tube gripping device or ferrule 80 is attached to the female threaded nut 52 by a thin frangible web portion 95. This web portion breaks (as illustrated in FIG. 2) when the ferrule 80 cams initially against a camming surface (88) during pull-up so that the tube gripping device or ferrule becomes a separate piece and functions with the nut and body in effect as a single ferrule fitting. The tube gripping device or ferrule 80 may be separately attached as indicated by reference 195 in FIG. 1A by any convenient process. The separated ferrule 80 has a back end 150 that is axially driven by a radially inwardly extending wall 152 of the nut 52 that serves as a drive surface for driving the ferrule 80 forward against the camming surface for completing an initial pull-up. The frangible web portion 95 is preferably designed so that upon separation of the device 80 from the nut 52, the surface 95a that is exposed along the break line does not interfere with the drive surface 152 of the nut during further pull-up to complete the assembly. As used herein, the terms "tube gripping device" and "ferrule" or "single ferrule" are used interchangeably when referring to the device 80 after separation from the nut 52.

The ferrule 80 is machined with the frangible web 95 portion by forming a radial groove 154 that is angled generally toward the inside of the female threaded nut 52. This groove 154 forms the back end 150 of the ferrule 80 and also the radial wall 152 of the nut that drive the ferrule axially against the camming surface after the ferrule 80 separates from the nut 52. Preferably but not necessarily the wall 152 and the back end 150 are machined at an angle of about 75° degrees or so relative to the tube bore axis X, although this angle may be different depending on the particular application. These surfaces 152 and 150 may be contoured to reduce galling and torque if so required.

Figure 3:
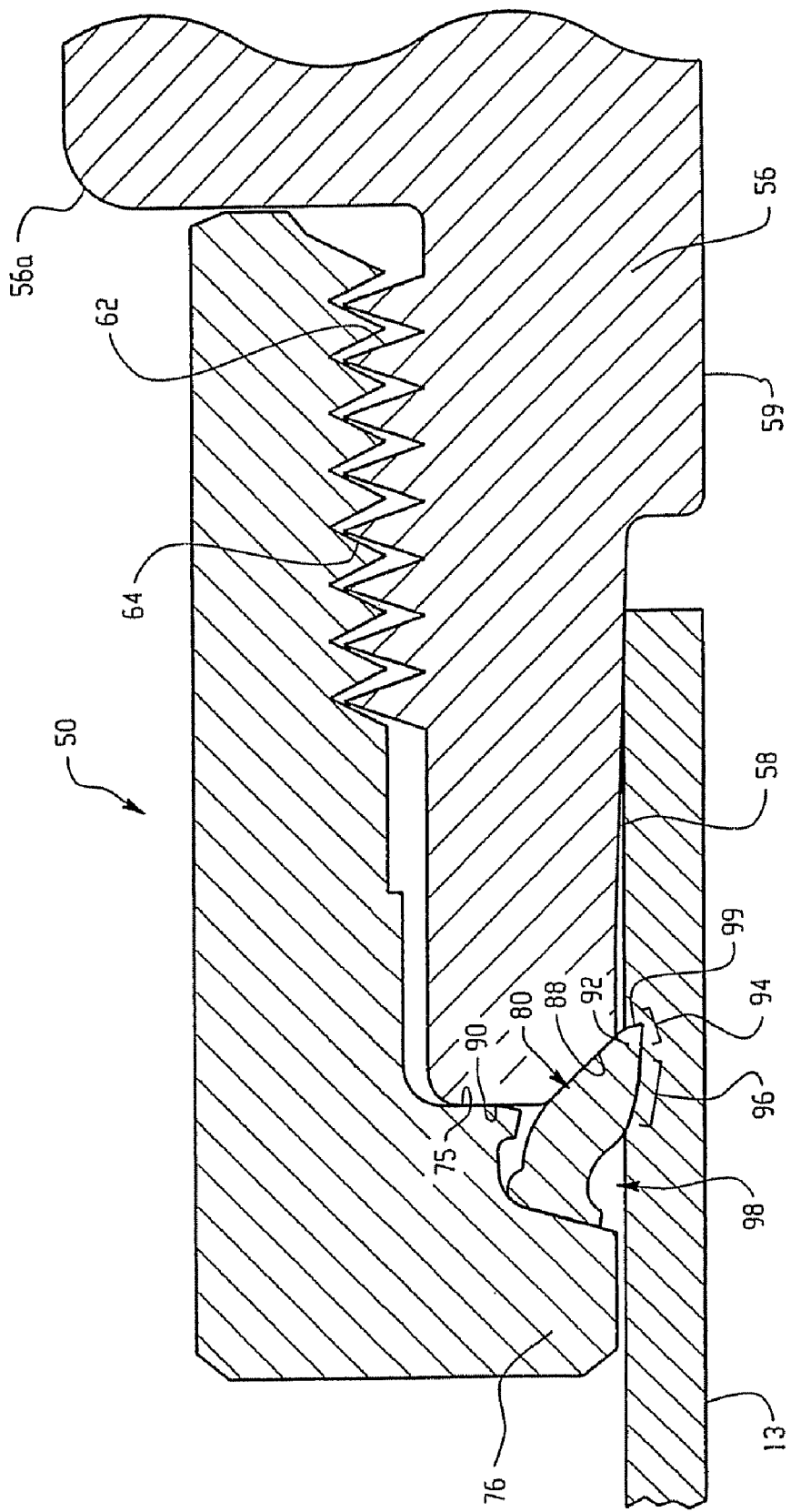
FIG. 3 illustrates the embodiment of FIG. 1 in a completed initial pulled up position.

With reference to FIGS. 1, 2 and 3, the tapered nose portion 84 initially engages an axially tapered camming surface 88 that forms an opening to the tube bore 58 in the main body 56. The tapered camming surface 88 is a surface that joins the bore 58 wall to the back end wall 90 of the body 54. This camming surface 88 is characterized by a generally frusto-conical contour. However, the shape of the surface 88 may be selected from other shapes depending on the particular ring deformation and tube gripping characteristics required for the fitting 50 in a specific application.

Upon a completed pull-up, the back end 90 of the body 54 contacts the trepan 75 which serves as a positive stop against over tightening. Should remakes be desired, the back end 90 may be axially spaced from the trepan 75 upon a completed first pull-up. Proper pull-up in this case may be verified using a gap gauge or other suitable technique, as is known.

The tube gripping ferrule 80 is shaped to effect several important functions of the fitting 50. The ferrule 80 must, upon proper pull-up, provide a fluid-tight primary seal against the tapered camming surface 88. This seal may be a primary outer seal for the tube fitting 50, or may be in effect a secondary or back-up seal to any seal formed between the tube end 13 and the body 54, for example along the bore wall 58 and/or the counterbore 60. The separated ferrule 80 also will form a primary seal at the location where the ferrule 80 bites into the outer surface of the tube end 13 in the area where the cylindrical bore 82 of the ferrule 80 engages the tube end outer surface. Again, this primary seal may in effect be a back-up or secondary seal to any seal formed by the tube end 13 against the body 54. In any event, the ferrule 80 must form primary seals against the camming surface 88 and the outer surface of the tube end 13. In addition, the ferrule 80 must adequately grip the tube end 13 so as to maintain seal integrity under pressure, temperature and vibration effects, and to prevent the tube end from separating from the fitting under such circumstances.

In order to achieve a fluid-tight seal and tube gripping action, the ferrule 80 is designed to be plastically deformed and swaged into the tube end upon completed pull-up, as illustrated in FIG. 3. This result is achieved by designing the ferrule 80 to have a hinging action whereby the tapered nose portion 84 is not only driven axially forward as the nut 52 is threaded onto the body 54, but also is radially displaced or driven into engagement with the outer surface of the tube end 13 wall. The forward end 92 of the nose portion 84 is thus compressed and embedded into the tubing wall with a resultant stress riser or bite in the region designated 94 in FIG. 3. The front end bite 94 produces a generally radially extending wall or shoulder 99 formed out of the plastically deformed tube end material. The shoulder 99 engages the embedded front end 92 of the gripping ring 80 to thus form an exceptionally strong mechanical resistance to tube blow out at higher pressures. The embedded front end 92 thus provides both an excellent seal and a strong grip on the tube end 13. The ring 80 is further designed to exhibit the aforementioned radially inward hinging action so as to swage or collet the cylindrical wall 82 against the tube end at a location axially adjacent or spaced from the stress riser bite 94 and generally designated with the numeral 96. This swaging and collet effect substantially enhances the tube gripping function and serves to isolate the embedded nose portion and bite 94 from the effects of down tube vibration and also temperature changes.

Although the present invention is described herein in the various embodiments as effecting an embedded nose portion and attendant swaging action, those skilled in the art will appreciate that in some applications such rigorous design criteria may not always be required, particularly for fittings that will be exposed to moderate temperature, vibration and pressure effects. Therefore, the additional design aspects of the nut, body and gripping ring set forth herein as preferred embodiments should therefore not be construed in a limiting sense but rather as selectable enhancements of the basic concepts of the invention to be used as required for particular applications.

In order to achieve the desired swaging action and tube grip, the ferrule 80 is designed to exhibit the hinging action that allows the tapered nose portion 84 and the central or mid-portion (as at the region of the cylindrical bore 82 or the region designated 94) of the gripping ring 80 to be radially inwardly compressed as it engages with the tapered camming mouth 88 of the body 56. This hinging action is also used to provide a significant radial displacement and compression of the cylindrical wall 82 to swage a central or mid-portion of the ferrule 80 body onto the tube end 13 axially adjacent to the stress riser 94. In the embodiment of FIGS. 1-3, the hinging action is facilitated by providing a preferred although not required radial inner circumferential notch 98 that is axially positioned between the cylindrical portions 72 and 82. The notch 98 is suitably shaped to permit the ferrule 80 to plastically deform and collapse in a controlled manner so as to radially compress the cylindrical wall 82 against the tube end with the desired collet effect. The particular geometry of the gripping ring 80 will thus be designed so that as the nut 52 is further threaded and tightened onto the body 54 after the ferrule 80 separates, the ferrule 80 hinges and plastically deforms to grip the tube end and to seal both against the tube end and the tapered camming mouth 88. Standard design procedures such as Finite Element Analysis may be used to optimize the geometry of the ring 80 based on variable factors such as the tubing material, tubing hardness and wall thickness, and required pressure, temperature and vibration performance characteristics.

Proper deformation of the ferrule 80 may further be controlled by selecting an appropriate contour for the tapered surface 88. This surface engages the tapered nose of the ferrule 80 and therefore will in part determine the timing and manner of how the ferrule 80 hinges, compresses and plastically deforms to properly embed the nose portion to bite into the tubing and also provide the desired collet or swaging action. Furthermore, the contour of the camming surface 88 may be designed to achieve the desired seal between the ferrule 80 nose portion and the tapered surface 88. This seal is important to the overall performance of the fitting, as is the seal provided between the ferrule 80 and the tube end 13.

The nut 52 with its integral tube gripping ferrule 80 may be manufactured by standard machining operations, and will typically include a trepan operation to form the outer contour of the ring 80. The other features of the nut 52 can be realized as well with known machining operations. Preferably but not necessarily the nut 52 includes wrench flats 102 to permit the user to tighten the nut 52 onto the body 54. Those skilled in the art will readily appreciate that use of the fitting 50 only requires relative rotation between the nut 52 and the body 54, such that either component or both may be rotated as required during a pull-up operation.

We have found that it is highly desirable for the camming surface 88 to form a camming angle $\theta$ of about 35°-60° relative to the longitudinal axis X of the fitting 50 and tube end 13. More preferably the angle $\theta$ of the camming surface 88 should be 40°-50°, and most preferred the angle $\theta$ should be about 45°. This range of angles for the camming surface 88 differs dramatically from commonly used metal ferrule-type tube fitting designs. Commonly used tube fittings have camming surface angles in the range of 10°-25°, which is a substantially shallower angle compared to the present invention. The shallower camming angle is necessary in prior art fittings to have the ferrule slide a greater axial distance along the camming surface. This greater sliding action permits the tube gripping device to be more gradually radially deformed into the tube end to form a gripping action or bite on the tube. This is especially the case for stainless steel tubing. Prior tube fittings that included what might appear to be a steeper camming angle actually either rely on a shallow portion of the camming surface or do not produce a bite in the tubing, thereby limiting the pressure resistance of the fitting. The shallow camming angle of the prior art, however, compromises the ability of a single ferrule to form a dependable seal. In sharp contrast, the present invention utilizes a substantially steeper camming surface angle $\theta$, which permits the gripping ring nose portion 84 in effect to be coined into the camming surface 88 without substantial sliding action, thereby forming an excellent seal.

In the exemplary embodiments herein, the nose portion 84 includes the radius portion 89 that transitions to the outer tapered surface 86. This outer surface 86 tapers generally at an angle that is not as steep as the angle of the camming surface 88. The tapered outer surface 86 preferably tapers axially with an increasing radial dimension towards the back end of the gripping ring 80. This tapered outer portion 86 contacts the camming surface 88 with, in effect, a generally narrow zone or line contact upon pull-up that has high stress and material coining to allow the front end of the gripping ring 80 to coin into the camming surface 88. Therefore, the term "generally narrow line contact" is not intended to preclude an area of contact between the outer tapered surface 86 and the camming surface 88, but rather more generally to the concept of a localized contact zone near or at the innermost extent of the camming surface 88 of high stress and material coining between the outer tapered surface 86 and the camming surface 88. By "coin" is simply meant that the gripping ring 80 achieves a good metal to metal seal between the radius portion 89 and the camming surface 88 by forming a generally narrow circumferential line contact of metal burnished on metal to effect a gas tight primary seal between the tapered surface 86 and the camming surface 88.

It is important to note that the use of a particular camming angle is not dependent necessarily on the contour of the surface 88. In other words, the angle of interest is the angle at which the front end of the gripping ring 80 contacts the camming surface 88 to form a seal thereat. Thus, the camming surface 88 may indeed be made with a non-frusto-conical contour, but the seal is still formed by the front end of the ferrule 80 contacting a steep angled surface 88. Additional compound angles or contours of the camming surface 88 may be used to better facilitate the hinging action and tube bite achieved by the ferrule 80.

Whether the camming surface 88 is formed as a compound angled surface with additional angled portions that are steeper or shallower to facilitate the hinging action and bite of the gripping ring 80 into the tube end 13, in accordance with this aspect of the invention, the sealing portion of the front end of the gripping ring 80 (in the exemplary embodiments the radius portion 89) forms the primary seal on a steep angled portion of the camming surface 88, preferably a steep angled portion in the range of angle $\theta$ of about 35°-60° relative to the longitudinal axis X of the fitting 50 and tube end 13, more preferably the angle $\theta$ of the camming surface 88 should be 40°-50°, and most preferred the angle $\theta$ should be about 45 at the location where the primary seal is to be formed. Preferably although not necessarily this primary seal is effected by a generally narrow line contact type engagement between the front end of the gripping ring 80 and the camming surface 88.

The steeper camming surface angle has the additional benefit that the nose or front portion of the tube gripping device 80 may be formed with substantially more mass as compared to if the front portion had to engage a shallower camming surface angle as in the prior art single ferrule and gripping ring designs. This added mass, along with the hinging action, tends to position a substantially greater mass of material at or near the location of the tube bite 94. This significantly strengthens the tube gripping device in resisting pressure and also strengthens the collet effect that isolates the bite from vibration and temperature effects, as contrasted to prior art single ferrule or gripping ring designs. The hinging action also results in the back end of the tube gripping device (i.e. the end opposite the nose end 84) from contacting the tube end, so that the entire tube gripping device is in axial and radial compression.

In general, for a tube gripping device such as a ferrule to embed into, bite and grip the tube end, the tube gripping device must be harder than the tube end. This is especially so for thick wall tubing. The greater axial movement of a ferrule in a shallow angle camming mouth of the prior art allows a ferrule to embed into a tube even when the ferrule is only moderately harder than the tube. Under these circumstances if the tube gripping device 80 were only moderately harder than the tube end, the device would be unable to adequately grip the tube for a steep angle camming surface because of the substantially shorter axial movement of the tube gripping device during pull-up caused by the steeper camming angle. However, in accordance with the present invention, by making the tube gripping device significantly harder than the tubing, a steeper angle camming surface may be used and is effective to cause the tube gripping device to adequately bite into the tube end to grip the tube.

The steeper camming angle $\theta$ of the present invention also results in a much shorter distance of axial displacement of the ferrule 80 during pull-up. Consequently, the nose portion 84 will need to be radially deformed and compressed into the tube end 13 with a much shorter axial displacement or sliding movement. In order to achieve the proper tube grip then, the ferrule 80 is preferably case hardened to a hardness of at least about 3.3 times harder than the tubing material. For example, if the tubing material is stainless steel, it may exhibit a hardness of up to about 200 Vickers. Therefore, in accordance with this aspect of the invention, when the fitting 50 is used with such hard materials, the tube gripping device should be hardened to a ratio of at least about 3.3 times harder than the tubing. More preferred, the tube gripping device should be hardened to a ratio of at least 4 times harder than the tubing. Still further, the entire gripping ring 80 need not be case hardened, but rather only the nose portion 84 may be selectively case hardened.

In accordance with this aspect of the invention, all or part of the nut 52 and body 54 may be through hardened or case hardened to increase the tube grip of the fitting 50 when used with harder tubing materials such as stainless steel. Suitable case hardening processes are fully described in U.S. Pat. Nos. 6,165,597 and 6,093,303 and copending patent application Ser. No. 09/494,093 filed on Jan. 28, 2000 for MODIFIED LOW TEMPERATURE CASE HARDENING PROCESS, issued to the assignee of the present invention, the entire disclosures of which are fully incorporated herein by reference. These processes produce a hardness of the tube gripping device of about 800 to 1000 Vickers or higher without compromising the corrosion resistance of the fitting. Other case hardening techniques however may be used as required. Case hardening of the tube gripping ring 80 allows the ring 80 to adequately grip and seal against tubing materials such as stainless steel including duplex stainless steel. The above referenced case hardening patents have an additional benefit of providing surfaces on the ring 80 that reduce or prevent galling between the ring 80 (which rotates with the nut 52) and the tubing.

Various lubricants may also be used with the tube gripping ring 80 to reduce galling and residual torsion such as, for example, PTFE greases, and greases containing molybdenum disulphide or tungsten disulphide.

Case hardening techniques typically will result in the entire nut 52 and integral tube gripping ring 80 to be case hardened. When the case hardening is performed on stainless steel, for example, as in the above referenced patents or patent application, an adherent oxide skin is formed. In another embodiment of the invention, a solid lubricant may be applied to the threads of the stainless steel nuts 52 to reduce friction and the hence pull-up torque during tightening. Any solid lubricant can be used for this purpose and many such solid lubricants are well known. A few examples are graphite, molybdenum disulfide, tungsten disulfide and UHMWPE (ultra high molecular weight polyethylene). These lubricants can be used neat, i.e. not combined with another material, or mixed with another material such as a resinous carrier or the like. In addition, they can be used in essentially any solid form including powders, granules and pastes.

Solid lubricants of this type are well known commercial products. Examples include Dow Corning® 321 Dry Film Lubricant available from Dow Corning Corporation of Midland, Mich. and Slickote® Dry Lube 100 available from Trans Chem Coatings, of Monrovia, Calif.

These lubricants can be applied by any standard method such as by hand, by aerosol or air spraying or by automatic equipment. Any coating thickness can be used which will provide lubricating properties. Solid lubricant thickness exceeding standard class 2 thread clearances are usually not required. If appropriate, the lubricant can also be heated to enhance its adhesion. For example, some lubricants, especially those supplied in a resinous binder, can be heated to effect cure of the binder. For example, Slickote® Dry Lube 100 can be heated following manufacturer's instructions to 300° F. for 1 hour, for example.

In a particular embodiment of the invention, a dry lubricant as described above is used on stainless steel nuts 52 which have been subjected to low temperature carburization using carbon monoxide as the carbon source. Stainless steel is stainless because of the thin, coherent chromium oxide film which inherently forms when the steel is exposed to air. Low temperature carburization of stainless steel parts, such as those made from AISI 316 and 316L, stainless steel, usually leaves the part surfaces coated with a layer of soot. Before use this soot is usually removed by washing. When carbon monoxide is used as the carbon source in low temperature carburization, not only does soot form but in addition a heavy oxide film also forms. This heavy oxide film is considerably different from the coherent chromium oxide film which makes stainless steel stainless in that it is thicker and not coherent. Therefore, this film is also removed before use to uncover the part's carburized surface.

In accordance with this particular embodiment, this heavy oxide film is not removed before application of the solid lubricant. Rather, it is left on the carburized part surfaces, or at least the portions of the carburized surfaces to be lubricated. In accordance this particular embodiment, it has been found that the naturally porous structure of this heavy oxide skin acts as an anchor for binding the lubricant to the part surfaces. As a result, the lubricant is more adherent than would otherwise be the case, and hence is able to withstand repeated fitting remakes (i.e., loosening and re-tightening of the nut) without being removed.

Figure 4:
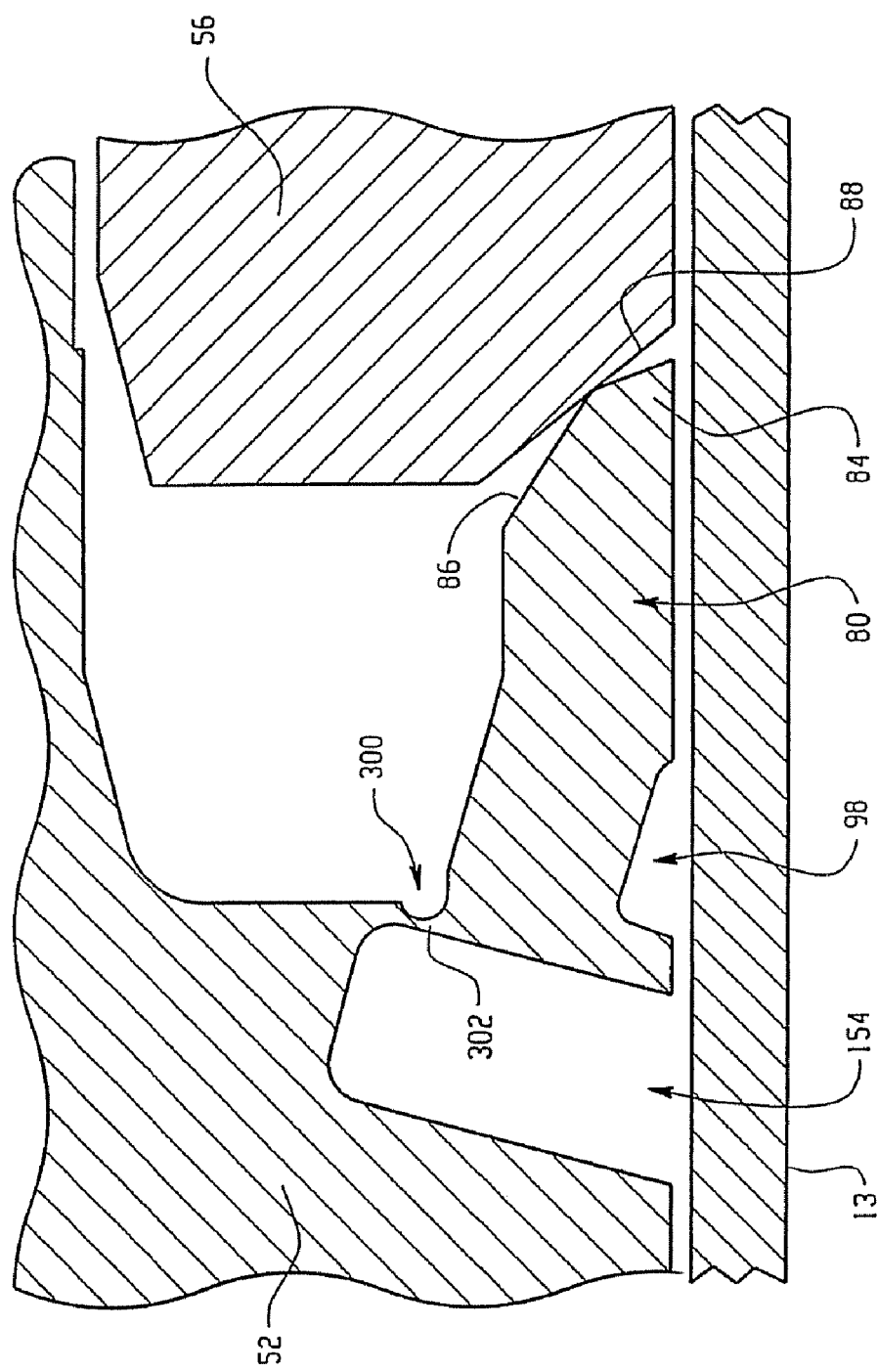
FIG. 4 illustrates another embodiment of the invention.

FIG. 4 illustrates another embodiment of the invention in which all elements are generally the same as the prior embodiment with one variation. In the frangible web portion 95, a stress concentrating notch 300 is formed therein. In this embodiment the stress concentrating notch 300 is formed as a generally tight radius that creates a thinner web of material 302 to promote a rapid clean break of the ferrule 80 from the nut 52. The break thus occurs as a result of a minimal span of rotation of the nut 52 shortly past finger tight position. The shape of the break is also less ragged. Other shapes of the notch 300 may be used as required including elliptical, triangular and so on for example.

The invention has been described with reference to the preferred embodiment. Clearly, modifications and alterations will occur to others upon a reading and understanding of this specification. It is intended to include all such modifications and alterations insofar as they come within the scope of the appended claims or the equivalents thereof.

The invention claimed is:

1. A female fitting component for use in a tube fitting in which there are only two separate components prior to assembly, wherein the only two separate components consist of the female fitting component and an externally threaded male component, wherein the tube fitting grips and seals a tube when the fitting is tightened, wherein the female fitting component comprises:
   a female nut having internal female threads;
   a tube gripping device attached with the female nut;
   wherein assembling of the female fitting component with the male fitting component separates the tube gripping device from the female nut;
   wherein the tube gripping device is configured such that during pull-up a forward end of the tube gripping device produces a tube bite into an outer surface of the tube, and said tube gripping device deforms so that a portion of an interior wall of said tube gripping device that is adjacent to the tube bite isolates the tube bite from vibration.

2. The coupling device of claim 1 wherein the tube gripping device is integrally formed with the female component.

3. The female fitting component of claim 1 the tube gripping device is separately attached with the female nut.

4. The female fitting component of claim 1 wherein the tube gripping device consists of a single ferrule.

5. The female fitting component of claim 1 wherein the tube gripping device is attached with the female nut by a metal structure.

6. The female fitting component of claim 5 wherein said metal structure is entirely contained within said female nut.

7. The female fitting component of claim 1 wherein the tube gripping device is configured such that a back end of the tube gripping device moves radially away from the tube during pull-up.

8. The female fitting component of claim 1 wherein said portion of the interior wall of the tube gripping device that is adjacent to the tube bite is radially compressed against the tube to isolate the tube bite from vibration.

9. A female fitting component adapted to join to a male fitting component of a tube fitting such that the male fitting component extends into the female fitting component and cause a tube gripping device to grip a tube and seal when assembled, the female fitting component comprising:
   a structure for attaching the tube gripping device to the female fitting component prior to joining the female fitting component with the male fitting component, wherein the structure for attaching the tube gripping device to the female fitting component consists of metal;
   wherein the tube gripping device is attached to the female fitting component and separates upon pull-up of the fitting.

10. The female fitting component of claim 9 wherein the structure for attaching the tube gripping device also attaches the tube gripping device to the female fitting component when the female fitting component and the male fitting component are in a finger tight condition.

11. The female fitting component of claim 9 wherein the tube gripping device is configured such that during pull-up a forward end of the tube gripping device produces a tube bite into an outer surface of the tube, and said tube gripping device deforms so that a portion of an interior wall of said tube gripping device that is adjacent to the tube bite isolates the tube bite from vibration.

12. The female fitting component of claim 11 wherein said portion of the interior wall of the tube gripping device that is adjacent to the tube bite is radially compressed against the tube to isolate the tube bite from vibration.

13. The female fitting component of claim 9 wherein the tube gripping device consists of a single ferrule.

14. The female fitting component of claim 9 wherein said structure for attaching the tube gripping device to the female fitting component is entirely contained within said female fitting component.

15. The female fitting component of claim 9 wherein the tube gripping device is configured such that a back end of the tube gripping device moves radially away from the tube during pull-up.

16. A method of making up a tube fitting comprising the steps of:
   attaching a tube gripping device to a female fitting component having internal threads as a separate unit;
   assembling the separate unit with a male fitting component;
   installing a tube end in the tube gripping device;
   pulling-up the fitting to secure the tube gripping device on the tube end such that a forward end of the tube gripping device produces a tube bite into an outer surface of the tube end, and said tube gripping device deforms so that a portion of an interior wall of said tube gripping device that is adjacent to the tube bite isolates the tube bite from vibration;

wherein the tube gripping device separates from the female fitting component upon pull-up of the fitting.

17. The method of claim 16 wherein the tube gripping device is separately attached to the female fitting component.

18. The method of claim 16 wherein the tube is a pipe.

19. The method of claim 16 wherein the tube gripping device consists of a single ferrule.

20. The method of claim 16 wherein the tube gripping device is attached with the female fitting component by a metal structure.

21. The method of claim 20 wherein said metal structure is entirely contained within said female fitting component.

22. The method of claim 16 wherein the tube gripping device is configured such that a back end of the tube gripping device moves radially away from the tube during pull-up.

23. The method of claim 16 wherein said portion of the interior wall of the tube gripping device that is adjacent to the tube bite is radially compressed against the tube to isolate the tube bite from vibration.

24. A tube fitting comprising:
a female fitting component adapted to receive a tube end;
a tube gripping device;
a male fitting component that can be joined to the female fitting component such that the male fitting component extends into the female fitting component and cause the tube gripping device to grip the tube and seal when assembled and tightened, such that a back end of the tube gripping device moves radially away from the tube during pull-up;
wherein the tube gripping device is attached with the female fitting component as a separate unit before the female fitting component is joined with the male fitting component to form the tube fitting assembly;
wherein assembling of the female fitting component with the male fitting component disengages the tube gripping device from the female fitting component.

25. The tube fitting of claim 24 wherein the tube gripping device is separately attached to the female fitting component.

26. The tube fitting of claim 24 wherein the tube is a pipe.

27. The tube fitting of claim 24 wherein the tube gripping device is configured such that during pull-up a forward end of the tube gripping device produces a tube bite into an outer surface of the tube, and said tube gripping device deforms so that a portion of an interior wall of said tube gripping device that is adjacent to the tube bite isolates the tube bite from vibration.

28. The tube fitting of claim 27 wherein said portion of the interior wall of the tube gripping device that is adjacent to the tube bite is radially compressed against the tube to isolate the tube bite from vibration.

29. The tube fitting of claim 24 wherein the tube gripping device consists of a single ferrule.

30. The tube fitting of claim 24 wherein the tube gripping device is attached with the female fitting component by a metal structure.

31. The tube fitting of claim 30 wherein said metal structure is entirely contained within said female fitting component.

32. The coupling device of claim 31 wherein said portion of the interior wall of the tube gripping device that is adjacent to the tube bite is radially compressed against the tube to isolate the tube bite from vibration.

33. A coupling device for a fitting that grips and seals a tube when the fitting is tightened, the coupling device comprising:
a female fitting component having internal female threads;
a tube gripping device consisting of a single ferrule attached together with the female fitting component as a separate unit before the female fitting component is joined with a male fitting component to form the fitting;
wherein assembling of the female fitting component with the male fitting component separates the tube gripping device from the female fitting component.

34. The coupling device of claim 33 wherein the tube gripping device is integrally formed with the female component.

35. The tube fitting of claim 33 wherein the tube gripping device is separately attached to the female component.

36. The coupling device of claim 33 wherein the tube gripping device is configured such that during pull-up a forward end of the tube gripping device produces a tube bite into an outer surface of the tube, and said tube gripping device deforms so that a portion of an interior wall of said tube gripping device that is adjacent to the tube bite isolates the tube bite from vibration.

37. The coupling device of claim 33 wherein the tube gripping device is attached with the female fitting component by a metal structure.

38. The coupling device of claim 37 wherein said metal structure is entirely contained within said female nut.

39. The coupling device of claim 37 wherein the tube gripping device is configured such that a back end of the tube gripping device moves radially away from the tube during pull-up.

* * * * *

UNITED STATES PATENT AND TRADEMARK OFFICE
CERTIFICATE OF CORRECTION

| | | |
|---|---|---|
| PATENT NO. | : 7,740,283 B2 | |
| APPLICATION NO. | : 11/928104 | |
| DATED | : June 22, 2010 | |
| INVENTOR(S) | : Mark A. Bennett et al. | |

It is certified that error appears in the above-identified patent and that said Letters Patent is hereby corrected as shown below:

On the front page of the patent, in the Related U.S. Application Data section (63), please insert the following after "7,108,288" --, which claims the benefit of International Application Serial No. PCT/US02/03431, filed Feb. 6, 2002--.

Col. 3, line 67, "canning" should read --camming--.

Col. 5, line 9, "riot" should read --not--.

Col. 15, claim 3, line 65, please insert --wherein-- after "claim 1".

Signed and Sealed this
Fourteenth Day of June, 2011

David J. Kappos
*Director of the United States Patent and Trademark Office*